June 30, 1942.   J. B. BEAUVAIS   2,288,431
WATER HEATING APPARATUS
Filed Aug. 19, 1941

INVENTOR.
BY John B. Beauvais.
Walter C. Rose Attorney.

Patented June 30, 1942

2,288,431

UNITED STATES PATENT OFFICE 2,288,431

WATER HEATING APPARATUS

John B. Beauvais, Holyoke, Mass., assignor to Albina Beauvais

Application August 19, 1941, Serial No. 407,477

5 Claims. (Cl. 122—165)

This invention relates to improvements in water heating apparatus.

The novel features of the invention are directed to the provision of apparatus for heating water which is characterized by its simplicity of form and efficiency in operation, thereby facilitating economy in manufacture and assembly and low cost operation.

With the foregoing and various other novel features and advantages and other objects of my invention as will become more apparent as the description proceeds, the invention consists in certain novel features of construction and in the combination and arrangement of parts as will be hereinafter more particularly pointed out in the claims hereunto annexed and more fully described and referred to in connection with the accompanying drawing wherein:

Figure 1:
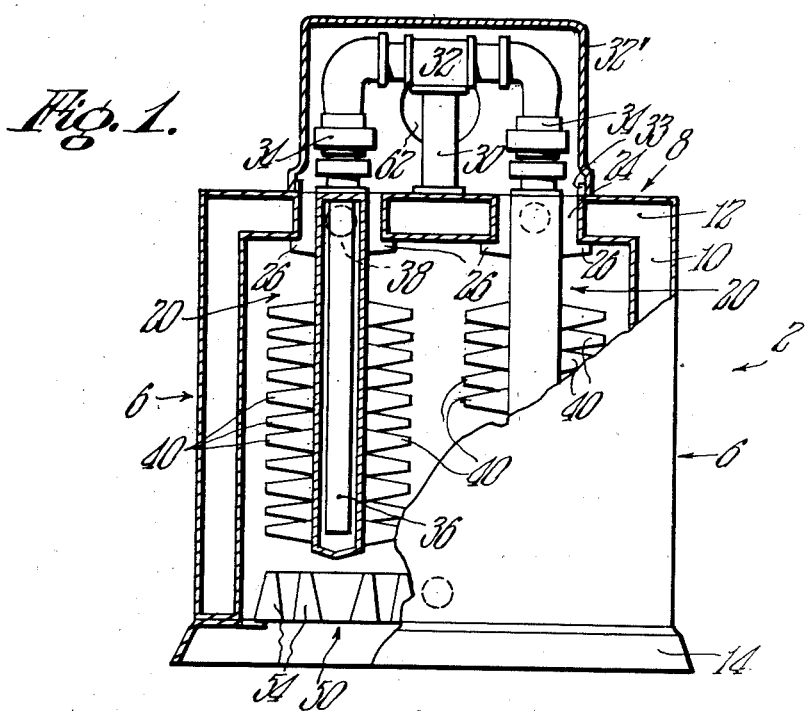
Fig. 1 is a combined side elevational and sectional view of a water heating apparatus embodying the novel features of the invention.
Figures 2, 3:
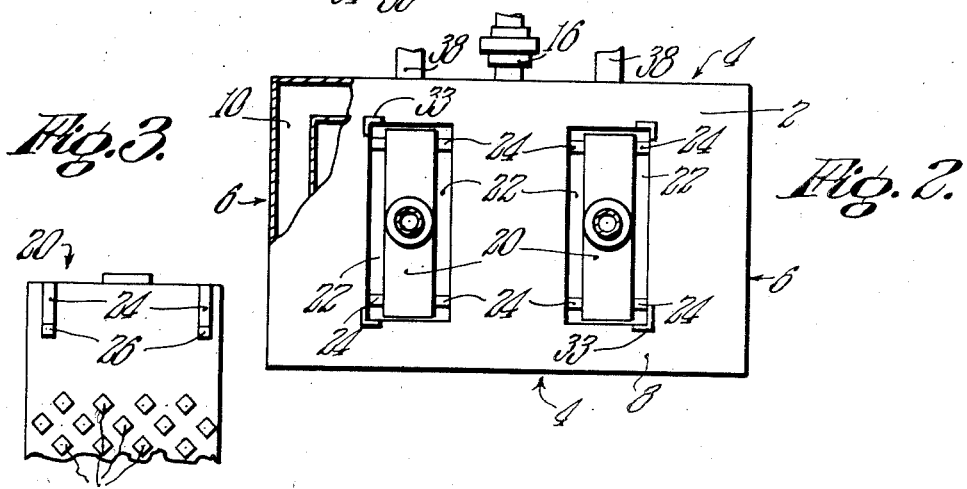
Fig. 2 is a plan view of the casing or outer shell of the heating apparatus shown in Fig. 1.
Fig. 3 is a side elevational view of the upper portion of one of the inner water chambers of the heater.

Referring to the drawing more in detail, the invention will now be fully described.

An outer casing 2 of the water heater has side and upper walls 4, 6 and 8 that include spaced apart wall members suitably joined together to provide a vertical water space 10 and an upper water space 12 in communication therewith. The casing may be supported by any suitable means such as a base 14 which may be arranged for associating the heater with a cooking range or the like if desired.

In the form of the invention shown, there may be one or more water inlets to the water space of the casing and located where desired and as indicated by 16. The casing shown is rectangular in shape but it may as well be circular or oval in shape, all as may be desired.

One or more openings extend through the upper wall 8 of the casing in which are disposed the upper ends of inner water compartment 20, as shown. The water compartments 20 are hollow having side, upper and lower walls and are preferably rectangular in cross section. The said water compartments are preferably narrower than the width of the openings in the upper wall 8 so as to provide spaces 22 at opposite sides thereof for the passage of flue gases and heat. Spacers 24 on opposite walls of the members 20 are provided for spacing and locating said members to maintain the passageways or spaces 22. Stops 26 abut the under side of the upper wall 8.

A connection 30 in communication with the water space 12 of the outer shell is connected to a T 32 which in turn is connected by fittings 34 to the water compartments 20. Water in the operation of the apparatus circulates upwardly in water space 10 into the upper water space 12 and through the connections to the inner compartments and downwardly thereinto through pipes 36. From the said inner water compartments warm or hot water may be delivered through outlets 38 which may be connected by any suitable means to a common hot water supply pipe. The water inlet and outlet connections may be varied within wide limits depending upon the particular use to which the heater is to be adapted. The connections 30, 32 and 34 and the stops 26 are adapted to suitably suspend and locate the inner compartments 20 relative to the openings in the upper wall.

Spines such as 40 extend outwardly from opposite walls of the inner water compartments 20. These spines are designed to absorb and transfer heat to the walls of the water compartment and thereby to the water therein. According to the invention, the spines are preferably of relatively large cross sectional area for the most effective heat transferring effect.

The spines are preferably tapering and have flat sides, as shown. The flat sides are angularly disposed relative to the horizontal and the said spines are preferably arranged in spaced staggering relation. In this way the flat sides are presented angularly to the vertical and to the upwardly traveling flame and hot gases which are directed sideways and upwardly thereby in a circuitous path wiping the said spines to insure the most efficient heat transfer effect and heating the inner compartments uniformly.

Figure 4:
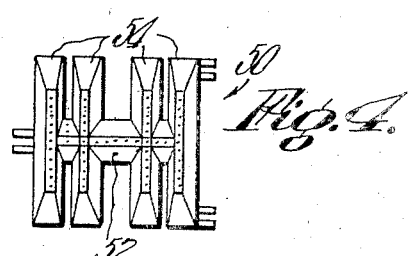
Fig. 4 is a plan view of a burner for the heater.

Burners such as 50 suitably supported in any convenient manner below the inner water compartments have transverse hollow main body parts 52 and longitudinal outwardly extending arms 54 which are also hollow. Fuel may be supplied the burners in any convenient manner as may be desired. The upper sides of the burners are provided with the usual outlet ports, as indicated in Fig. 4.

A cap or cover 32' is provided on the upper wall for enclosing the upper side of the apparatus, as shown, and it has a suitable opening 62 for connection to a flue.

The cover 32' may be held in place by any suitable means and secured to the casing in any desired manner there being, for purposes of disclosure, upstanding members 33 for locating the cover.

In the embodiment of the invention shown, there are two inner water compartments 20, but it will be understood that there may be one or as many such compartments as may be desired with a burner for each.

In operation the flame provided by fuel emitted by the burners passes upwardly against the spines through the circuitous passageways framed thereby and past the sides of the inner water compartments, through passageways 22 and outwardly through outlet 62.

The passageways 22 are relatively narrow and disposed, as they are, at the sides of the upper ends of compartments 20 the heat is directed inwardly towards the walls of the compartments instead of moving outwardly thereby to efficiently wipe the spines and walls and heat the walls and the spines of the compartments. The hot gases, of course, heat the connections connecting the upper water space 12 with the inner water compartments 20 thereby contributing to the efficiency of the apparatus.

From the foregoing it will be observed that the construction is such as enhances the most efficient heat transfer thereby to provide the most efficient heating of the water while at the same time the construction is relatively simple thereby to effect economy in manufacturing of the parts and their assembly.

Important features are the spines arranged as they are in staggered relation and provided with flat faces angularly disposed so that the flame and hot gases wipe thereagainst as the same take an upward circuitous path to and through the relatively narrow passageways adjacent the upper opposite sides of the inner water compartments.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. A water heater comprising in combination, an outer casing having side and upper walls including interconnected spaced wall members providing interconnected vertical and upper water spaces, the upper wall provided with rectangular openings, hollow inner water compartments rectangular in cross section having upper ends disposed in said openings, spacers between opposite sides of said compartments and adjacent sides of the openings forming passageways at the upper sides of said compartments, water connections between the upper water chamber and compartments above the upper wall of the outer casing, a cover member on the upper wall of the casing around said connections having an outlet, and burners below said inner water compartments.

2. A water heater comprising in combination, an outer casing having side and upper walls including interconnected spaced wall members providing interconnected vertical and upper water spaces, the upper wall provided with rectangular openings, hollow inner water compartments rectangular in cross section having upper ends disposed in said openings, spacers between opposite sides of said compartments and adjacent sides of the openings forming passageways at the upper sides of said compartments, water connections between the upper water chamber and compartments above the upper wall of the outer casing, a cover member on the upper wall of the casing around said connections having an outlet, burners below said inner water compartments, and spines extending outwardly from opposite walls of said inner compartments arranged in staggered relation transversely over the arms of said burners.

3. A water heater comprising in combination, an outer casing having side and upper walls including interconnected spaced wall members providing interconnected vertical and upper water spaces, the upper wall provided with rectangular openings, hollow inner water compartments rectangular in cross section having upper ends disposed in said openings, spacers between opposite sides of said compartments and adjacent sides of the openings forming passageways at the upper sides of said compartments, water connections between the upper water chamber and compartments above the upper wall of the outer casing, a cover member on the upper wall of the casing around said connections having an outlet, burners below said inner water compartments having longitudinal arms parallel to the side walls of said compartments, and spines extending outwardly from opposite walls of said inner compartments arranged in staggered relation transversely over the arms of said burners.

4. A water heater comprising in combination, an outer casing having side and upper walls including interconnected spaced wall members providing interconnected vertical and upper water spaces, the upper wall provided with rectangular openings, hollow inner water compartments rectangular in cross section having upper ends disposed in said openings, spacers between opposite sides of said compartments and adjacent sides of the openings forming passageways at the upper sides of said compartments, water connections between the upper water chamber and compartments above the upper wall of the outer casing, a cover member on the upper wall of the casing around said connections having an outlet, burners below said inner water compartments, spines extending outwardly from opposite walls of said inner compartments arranged in staggered relation transversely over the arms of said burners, and having flat faces angularly disposed providing upwardly extending circuitous passageways therebetween.

5. A water heater comprising in combination, an outer casing having side and upper walls including interconnected spaced wall members providing interconnected vertical and upper water spaces, the upper wall provided with rectangular openings, hollow inner water compartments rectangular in cross section having upper ends disposed in said openings, spacers between opposite sides of said compartments and adjacent sides of the openings forming passageways at the upper sides of said compartments, water connections between the upper water chamber and compartments above the upper wall of the outer casing, a cover member on the upper wall of the casing around said connections having an outlet, burners below said inner water compartments having longitudinal arms parallel to the side walls of said compartments, spines extending outwardly from opposite walls of said inner compartments arranged in staggered relation transversely over the arms of said burners, and having flat faces angularly disposed providing upwardly extending circuitous passageways therebetween.

his
    JOHN B. × BEAUVAIS.
          mark

Witness to mark:
 WALTER C. ROSS, JR.